US007707493B2

(12) United States Patent
Vion-Dury et al.

(10) Patent No.: US 7,707,493 B2
(45) Date of Patent: Apr. 27, 2010

(54) METHOD FOR GENERATING PRESENTATION ORIENTED XML SCHEMAS THROUGH A GRAPHICAL USER INTERFACE

(75) Inventors: Jean-Yves Vion-Dury, St. Ismier (FR); Jean-Pierre Chanod, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 750 days.

(21) Appl. No.: 11/600,567

(22) Filed: Nov. 16, 2006

(65) Prior Publication Data
US 2008/0120316 A1    May 22, 2008

(51) Int. Cl.
G06F 17/27    (2006.01)
(52) U.S. Cl. ................. 715/237; 715/234; 715/235; 715/240; 707/102
(58) Field of Classification Search .......... 715/234–237
See application file for complete search history.

(56) References Cited

U.S. PATENT DOCUMENTS

| | | | | | |
|---|---|---|---|---|---|
| 5,963,642 | A | * | 10/1999 | Goldstein | 713/193 |
| 7,089,491 | B2 | * | 8/2006 | Feinberg et al. | 715/234 |
| 7,200,816 | B2 | * | 4/2007 | Falk et al. | 715/762 |
| 7,237,190 | B2 | * | 6/2007 | Rollins et al. | 715/234 |
| 2004/0194028 | A1 | * | 9/2004 | O'Brien | 715/517 |
| 2005/0060645 | A1 | * | 3/2005 | Raghavachari et al. | 715/513 |
| 2005/0097448 | A1 | * | 5/2005 | Giannetti et al. | 715/508 |
| 2005/0183007 | A1 | * | 8/2005 | Gaug et al. | 715/513 |

OTHER PUBLICATIONS

James Clark; Namespace Routing Language (NLR); Thai Open Source Software Center, Ltd; Jun. 13, 2003, pp. 1, 5.*
Jon Ferraiolo, Jun Fujisawa, and Dean Jackson; Scalable Vector Graphics (SVG) 1.1 Specification; World Wide Web Consortium, Nov. 15, 2002, pp. 1, 6.*
Badros et al., "The Cassowary Linear Arithmetic Constraint Solving Algorithm: Interface and Implementation," Technical Report UW-CSE-98-06-04, pp. 1-31, 1998.
Aiello et al., "Thick 2D Relations for Document Understanding," Elsevier Science, pp. 1-32, 2002.
Allen, "Maintaining Knowledge about Temporal Intervals," Communications of the aCM, vol. 26, No. 11, pp. 832-843, 1983.
Jelliffe, "The Schematron," Academia Sinica Computing Centre, Taibei, 8 pp., 1999-2001.
"RELAX NG," 6 pp. At.relaxng.org/, 2003.
Clark, "RELAX NG Compact Syntax," at oasis-open.org/committees/relax-ng/compact-20021121.html, pp. 1-30, 2002.
Pietriga et al., "VXT: A Visual Approach to XML Transformations," Proceedings of the 2001 ACM Symposium on Document Engineering, Atlanta, Georgia, pp. 1-10, 2001.
Clark, "Namespace Routing Language (NRL)," Thai Open Source Software Center Ltd., pp. 1-22, at .thaiopensource.com/relaxng/nrl.html, 2003.

* cited by examiner

*Primary Examiner*—Doug Hutton
*Assistant Examiner*—Andrew R Dyer
(74) *Attorney, Agent, or Firm*—Fay Sharpe LLP

(57) ABSTRACT

A document rendering system includes a standard schema and a graphical user interface configured to receive graphically represented presentation constraints. A translation engine is configured to translate the graphically represented presentation constraints into a presentation schema conforming with a syntax of the standard schema. A validation engine is configured to validate a document respective to the standard schema and respective to the presentation schema. A rendering engine is configured to render a document conditional upon validation by the validation engine.

17 Claims, 8 Drawing Sheets

METHOD FOR GENERATING PRESENTATION ORIENTED XML SCHEMAS THROUGH A GRAPHICAL USER INTERFACE

BACKGROUND

The following relates to the document presentation arts. It especially relates to presentation of documents in the extensible markup language (XML) format, and is described with particular reference thereto. However, the following is applicable to presentation of structured documents generally, including for example documents in XML, the standard generalized markup language (SGML), or so forth.

An advantage of using a structured document format such as XML is that the document can be validated as to whether it conforms with a standard schema. Some example presentation-focused XML schema that are presently in use include the W3C scalable vector graphics (SVG) schema, extensible hypertext markup language (XHTML), XML formatting objects (XML-FO), and so forth. Before the document is rendered, it is checked, or validated, by a suitable validation tool to ensure that the document conforms with the standard schema. The rendering engine is configured to properly render any document conforming with the standard schema.

Thus, for example, by validating before rendering an input document using a SVG validation tool such as RelaxNG or Schematron and a suitable schema, it can be assured that the document will be properly rendered by the SVG rendering engine. If the validation detects errors, these errors can be brought to the attention of a human publisher before rendering. The human publisher can then either modify the input document to correct the detected error, or go forward with the rendering in spite of the detected error.

Validation prior to rendering ensures that the document can be properly processed by the rendering engine. However, it does not ensure that the rendered document will conform with a presentation appearance desired by the document publisher. For example, the publisher may want to produce a brochure in which text is presented in three columns per page. The document may pass the validation tool but not satisfy the publisher's appearance requirements, for example if the document is in proper SVG format but includes only two columns per page. Validation occurs because nothing in the standard schema constrains the number of columns per page.

One option is to provide a more specific presentation-focused standard schema, for example requiring three columns per page. However, the goal of the standard schema is to balance between constraining the document presentation to ensure proper rendering, on the one hand, and providing the publisher with flexibility in selecting the presentation appearance, on the other hand. Presentation-focused standard schema such as SVG, XHTML, XML-FO, and so forth have generally been configured to maximize flexibility, so as to make the standard schema widely usable by a large cross-section of publishers. Including a specific constraint such as a specific number of columns per page would limit the usability of the standard schema.

Another option is to provide a number of a different standard schema conforming with the different presentation appearance objectives of different publishers. However, construction of a schema, or even modification of an existing schema, heretofore has been a laborious process suitably performed by highly skilled persons having extensive knowledge of non-intuitive low-level schema definition syntax. Applying such specialized expertise to generate a specialized standard schema targeting a small number of publishers may not be commercially viable. That is, a more specialized standard schema would have a smaller market, and thus would be less likely to be commercially successful.

Accordingly, the usual process is for the publisher to perform validation with a flexible standard schema such as SVG, XHTML, XML-FO, and so forth, and to render the document upon successful validation. The publisher then visually reviews the rendered document to detect deviations from the desired presentation appearance. If such deviations are detected, the document is modified and the validation and rendering repeated until conformance with the desired presentation appearance is achieved. This procedure takes a substantial portion of the publisher's time, may require multiple validation and rendering cycles, and is susceptible to human error. Moreover, the procedure must be repeated for each and every document that is validated and rendered. In applications in which the rendered document is ultimately physically printed, presentation errors that slip by unnoticed by the publisher can result in printing a large number of non-conforming, and perhaps useless, documents.

BRIEF DESCRIPTION

According to aspects illustrated herein, there is provide a document rendering system comprising: a standard schema; a graphical user interface configured to receive graphically represented presentation constraints; a translation engine configured to translate the graphically represented presentation constraints into a presentation schema conforming with a syntax of the standard schema; a validation engine configured to validate a document respective to the standard schema and respective to the presentation schema; and a rendering engine configured to render a document conditional upon validation by the validation engine.

According to aspects illustrated herein, there is provided a document validation method comprising: receiving graphically represented presentation constraints; translating the graphically represented presentation constraints into a presentation schema conforming with a syntax of a standard schema; and validating a document respective to the standard schema and respective to the presentation schema.

According to aspects illustrated herein, there is provided a document rendering system comprising: a standard schema; a graphical user interface including a graphical display and a pointing device cooperating with the graphical display, the graphical user interface configured to receive one or more geometrically constrained content boxes delineated using the graphical display and cooperating pointing device; a translation engine configured to translate the one or more geometrically constrained content boxes into a presentation schema conforming with a syntax of the standard schema; a validation engine configured to validate a document respective to the standard schema and respective to the presentation schema; and a rendering engine configured to render a document conditional upon validation by the validation engine.

BRIEF DESCRIPTION OF THE DRAWINGS

FIG. 5 shows graphical constraints on a page including content boxes, while FIG. 6 shows constraints of one of the content boxes.

DETAILED DESCRIPTION

Figure 1:
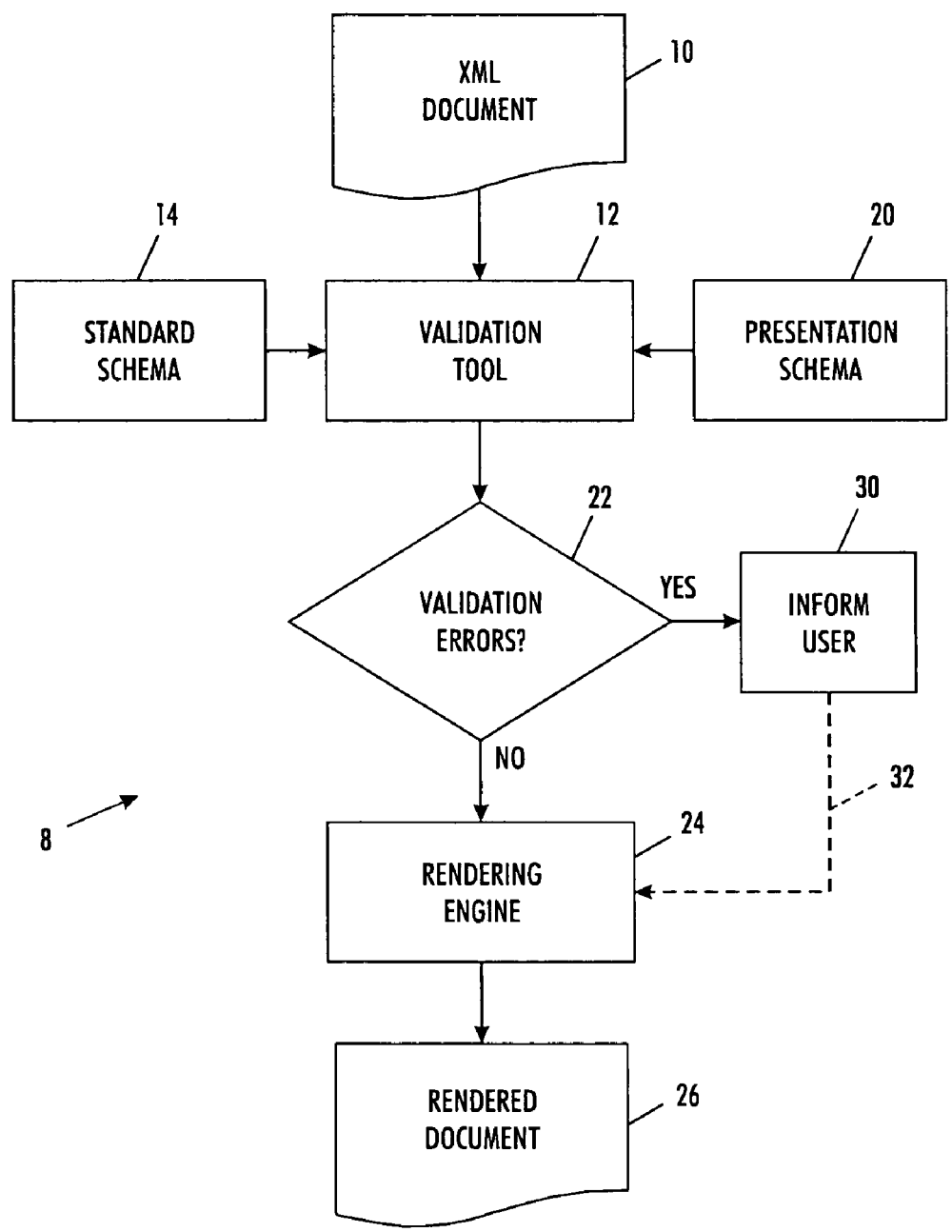
FIG. 1 diagrammatically shows a system for generating presentation constraints translated into a presentation schema conforming with a syntax of a standard schema.

With reference to FIG. 1, a document rendering system 8 for rendering a structured document 10 is diagrammatically shown. The example structured document 10 is an XML document; however, the rendering approaches disclosed herein are readily modified for use in conjunction with other structured document formats such as SGML. The document 10 is input to a validation tool 12, which may be a single validation tool such as RelaxNG or Schematron, or a combination of validation tools such as RelaxNG and Schematron applied sequentially or in parallel to the document 10. The validation tool 12 validates the document 10 with respect to a standard schema 14, such as SVG, XHTML, XML-FO, and so forth.

The validation tool 12 also validates the document 10 with respect to a presentation schema 20 that is typically a more specialized schema than the standard schema 14. The presentation schema 20 is typically a user-created schema (for example, created by the publisher or other user who is rendering documents). The presentation schema 20 imposes presentation constraints selected by the human publisher, so as to enforce presentation policies set by the publisher. Such presentation policies may include, for example: text grouping or ordering into columns, sections, or so forth; use of selected font types, font sizes, or font characteristics; limiting the types of objects that can be printed (for example, to exclude color images); use (or non-use) of selected headers, footers, watermarks or other repeated objects on each page; and so forth. The presentation schema 20 conforms with a syntax of the standard schema 14, so that the same validation tool 12 (which again may be a combination of validation tools such as RelaxNG and Schematron applied sequentially or in parallel) can be used to validate the document 10 with respect to both the standard schema 14 and the presentation schema 20.

At a decision block 22, it is determined whether the validation tool 12 has detected any errors respective to either the standard schema 14 or the presentation schema 20. If no errors are detected, then the document 10 is forwarded to a rendering engine 24 that processes the structured document 10 to produce a rendered document 26. For example, the rendering engine 24 may convert the example XML document 10 into a PDF document, a PostScript document, or other document having a format readily processed by a display or printing device. Alternatively, the rendering engine 24 may directly print the document using a printing device without generating a rendered document file. Because the document 10 was successfully validated by the validation tool 12 respective to the standard schema 14, it is ensured that the document 10 can be processed by the rendering engine 24 without errors. Additionally, because the document 10 was successfully validated by the validation tool 12 respective to the presentation schema 20, it is expected that the presentation appearance of the rendered document 24 will conform with the presentation policies embodied by the presentation schema 20.

On the other hand, if one or more errors are detected at the decision block 22, then the document rendering system 8 informs the publisher or other human user via an output device 30, which may for example be a cathode ray tube display, LCD display, organic LED (OLED) display, plasma display, or so forth. The user may elect to modify the structured document 10 to correct the detected errors, and then re-run the validation. On the other hand, the user may elect to forward the structured document 10 to the rendering engine 24 in spite of the detected errors (this optional decision being indicated in FIG. 1 by a dotted connector 32). The rendering engine then renders the document, albeit possibly with some deficiencies due to the uncorrected error or errors. In some embodiments, the optional decision path 32 is not allowed, or may be barred in the case of certain designated "fatal" detected errors.

Figure 2:
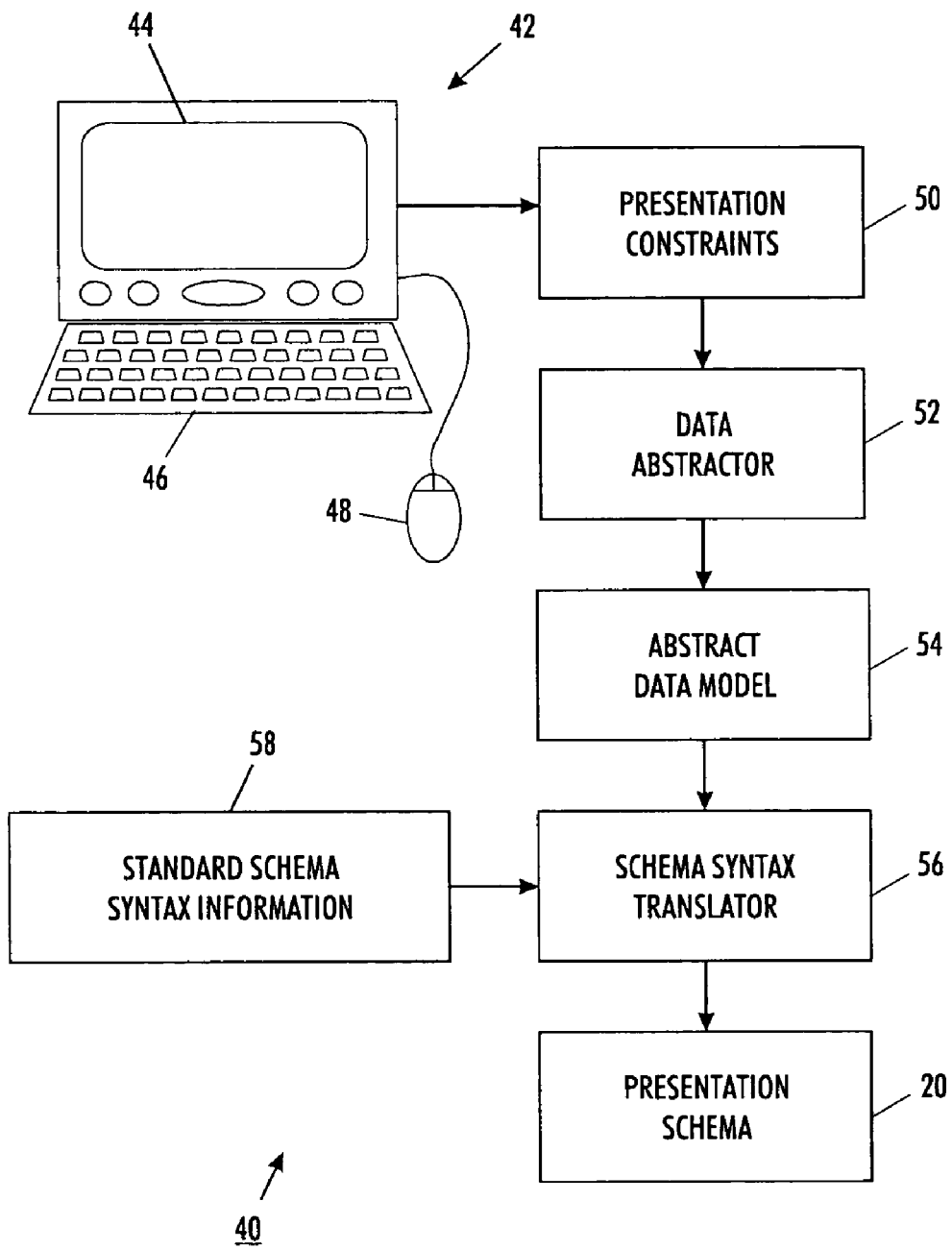
FIG. 2 diagrammatically shows a document rendering system that validates a document before rendering using a standard schema and also the presentation schema conforming with the syntax of the standard schema generated by the system of FIG. 1.

With reference to FIG. 2, a system 40 is diagrammatically shown for generating presentation schema 20 used in the rendering system 8 of FIG. 1. Advantageously, the system 40 is configured to be readily used by a publisher or other person who understands concepts such as presentation layout, page design, and other high level printing concepts, but who does not have expertise in low-level schema design. A graphical user interface 42 includes a graphical display 44, such as a cathode ray tube display, LCD display, OLED display, plasma display, or so forth, and one or more input devices such as a keypad or keyboard 46, a pointing device such as an illustrated mouse 48, or a trackball, trackpad, graphical tablet, touch-sensitive screen, or so forth. In the example illustrated graphical user interface 42, the various components 44, 46, 48 are interconnected in a wired fashion; however, it is also contemplated to employ WiFi, Bluetooth or other wireless connections between at least some components of the graphical user interface.

The graphical user interface 42 is configured to enable a publisher or other human user to input graphically represented presentation constraints 50 such as one or more graphically represented content boxes and geometrical constraints on said content boxes. The presentation constraints 50 may include other constraints such as constraints on content of a graphically represented content box (e.g., constraints on object type, font attribute, font type, or so forth), constraints on a number of repetitions of a content box, or so forth. A data abstractor 52 is configured to convert the graphically represented presentation constraints 50 into an abstract data model 54 embodying the presentation policies of the presentation constraints 50. The abstract data model 54 may, for example, be a box tree model having boxes corresponding to the graphically delineated content boxes of the presentation constraints 50 and a tree configuration indicative of relationships between the content boxes. A schema syntax translator 56 is configured to translate the data abstraction model 54 into the presentation schema 20 conforming with standard syntax 58 of the standard schema 14 also employed by the rendering system 8 of FIG. 1.

The set of available operations for inclusion in the presentation schema 20 depends on the syntax 58 of the standard schema 14, as different schema have different expressiveness capabilities from the visual rendering standpoint. For example, the XSL-FO color model does not handle transparency, whereas some other standard presentation-focused schema do provide for transparency. Moreover, the system 40 optionally employs as the syntax 58 a selected sub-set of the syntax of the standard schema 14, so as to provide a less powerful but more general and independent presentation schema that may, for example, be usable in conjunction with different structured document formats or a plurality of different standard schema having syntactical commonalities.

In the illustrative examples, the presentation schema 20 includes presentation containers or content boxes that delimit a specific spatial or geometrical zone or region in a page, and optional associated content constraints. The presentation constraints 50 typically describe spatial positioning, the types and styles of text allowed in a content box, and repetition patterns for a content box such as the number of occurrences allowed for a given content box. The page itself is considered as a box by default. The graphical user interface 42 is configured to enable the publisher or other user to delineate content boxes and to associate delineated content boxes with content constraints, repetition constraints, geometrical constraints respective to the page content box or to another smaller content box, or so forth. The illustrative examples set forth herein specify some selectable, and typically graphically defined, constraints that enable the publisher or other user to flexibly set forth a desired presentation policy using the system 8. Some of the graphically represented presentation constraints may be input in a non-graphical format—for example a content box may be set forth graphically, but the font size or font size range allowable in this content box set forth via a text input, a drop-down list or other GUI dialog box, or so forth. Such non-graphical input describing the graphically represented content boxes is to be construed as part of the graphically represented presentation constraints.

In an illustrative example approach, the graphical user interface 42 is configured to allow the publisher or other user to graphically define spatial constraints such as content boxes based on spots or points (representing, for example, (x, y) coordinates in the page) selectable by cooperation of the graphical display 44 and pointing device 48. The spots or points represent manipulation anchors used to define content boxes in the page. Various operators can be used to select and create spots, such as: free interactive positioning (that is, generating a floating spot positioned anywhere in the page, for example by pointing to coordinates on the graphical display 44 using the pointing device 48 and clicking a mouse button or otherwise activating selection of the pointed-to coordinates as a spot); generating a barycentric spot corresponding to the barycenter of n pre-selected spots; linear splitting between two selected spots, optionally with an interactive parameter indicating the splitting factor; and so forth. Spots are suitably associated with a palette of spot linking operators that define constraints bearing on spots, such as relative positioning between two spots according to x and y coordinates. Such relative positioning constraints may include, for example: "less than in the x-direction," denoted herein as $<_x$; "less than or equal to in the x-direction," denoted herein as $\leq_x$; "equal in the x-direction," denoted herein as $=_x$; and corresponding operators for the y-direction denoted as $<_y$, $\leq_y$, and $=_y$, respectively. Such constraints can be used, for instance, to define embedded content boxes or various symmetries and alignments between content boxes. In the example embodiment, the page is a content box by default; accordingly, such relative operators can also be used to designate positioning of a content box in the page. Other contemplated positioning constraints may include, for example, absolute constraints such as requiring to spots to be separated in the x-direction by a specified distance.

Similarly, operators can be defined to create segments by selecting two spots, and to define constraints bearing on segments such as a constraint based on comparing the lengths of two segments. Such segment constraints can be useful to define zoning constraints on content boxes, such as a top, bottom, left, or right margin, or to ensure that two content boxes have similar sizes or are evenly distributed in a certain area.

Box operators can be defined to select and create content boxes, for example by selecting spots indicating two opposite corners of a content box, and may also describe additional constraints on content boxes. In some embodiments, two-dimensional Allen operators are used to specify contiguity and/or overlapping constraints between content boxes. One-dimensional Allen operators are discussed for example in Allen, "Maintaining Knowledge about Temporal Intervals", Communications of the ACM vol. 26 no. 11, pp. 832-43 (1983), and the extension to two-dimensional space is discussed for example in Aiello & Smeulders, "Thick 2D Relations for Document Understanding", University of Trento Technical Report # DIT-02-0063 (2002). Other classes of positioning or related operators may be considered, for instance to define the relative positioning of content boxes across multiple layers.

Figure 3:
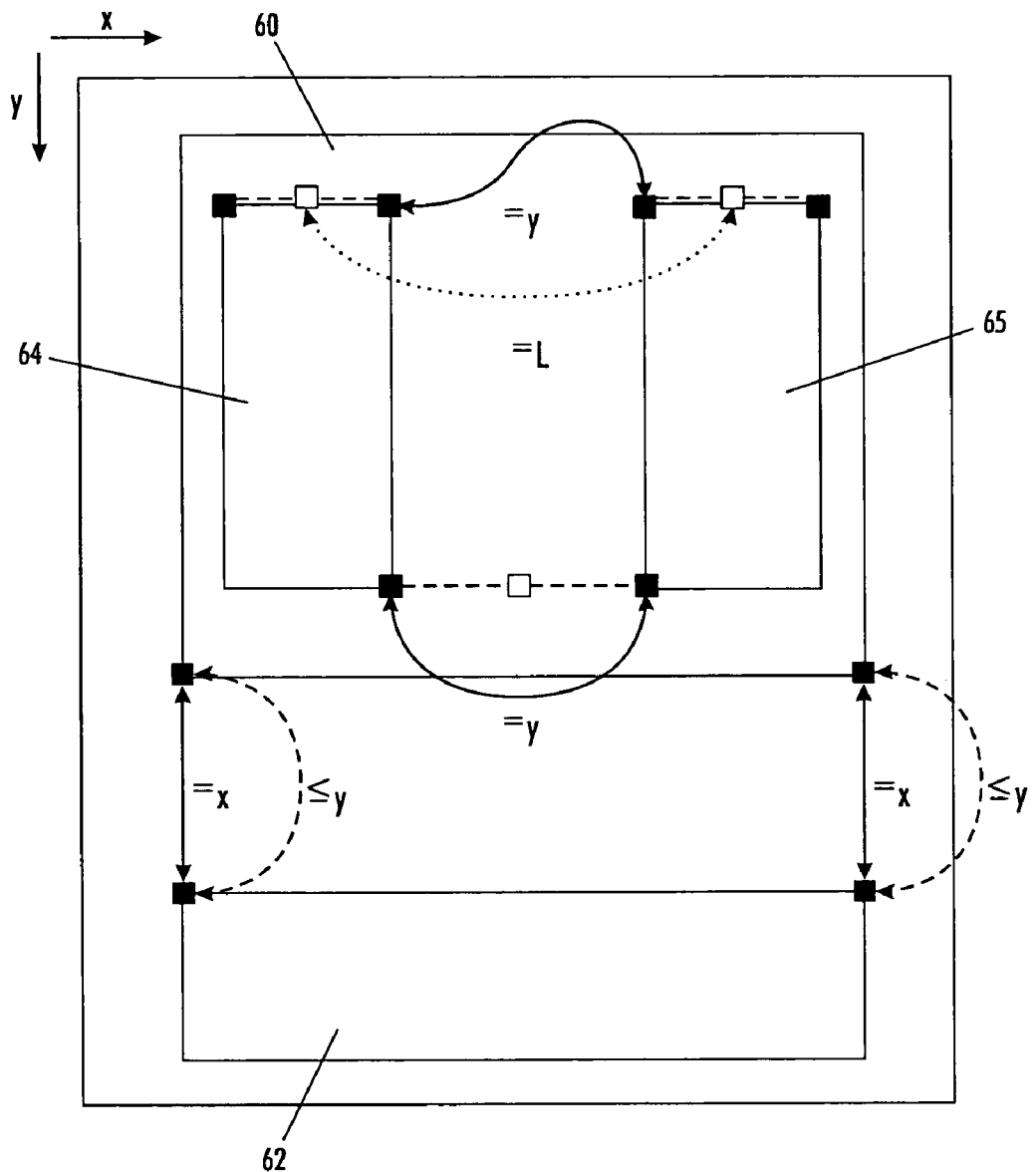
FIG. 3 diagrammatically shows an illustrative example of using the graphical user interface of FIG. 2 to input constraints related to a page model description.

With reference to FIG. 3, an illustrative example shows an approach for using the graphical user interface 42 to input constraints related to a page model description where the page area is divided into a body area 60 located above a footer area 62 of same width; the body area 60 contains two "floating" columns 64, 65 of equal height and width. Nothing is specified about the position of the body area 60 inside a page. Similarly, nothing is specified about the position of columns 64, 65 inside the body area 60. In FIG. 3, small filled squares represent spots, dashed curved double-arrowhead lines symbolize $<_y$ constraints between the body area 60 and the footer area 62, while solid curved double-arrowhead lines represent $=_y$ constraints between the top and bottom of the columns 64, 65. Solid straight double-arrowhead lines represent $=_x$ constraints between the body and footer areas 60, 62. The figure also illustrates a segments denoted by a dashed straight lines and bisected by a segment bisection spot (indicated by a small open square in FIG. 3), and a length equality constraint, denoted $=_L$ in FIG. 3 and further indicated by a dotted curved double-arrowhead line, respective to the width in the x-direction of the columns 64, 65.

The system 8 optionally checks the consistency of constraints, for example incrementally or on user invocation of a specific verification operation. This kind of validation can be ensured, for example, through a general purpose constraint solver embedded in graphical user interface front end. One suitable solver is described, for example, in Greg J. Badros and Alan Borning, "The Cassowary Linear Arithmetic Constraint Solving Algorithm: Interface and Implementation", Technical Report UW-CSE-98-06-04, June 1998. The graphical interaction optionally also handles contextual display, such as displaying only visual information relevant to the current action, in order to avoid user overloading. Suitable approaches for contextual display include multiple views, transparency masks or filters, or so forth.

Content-driven constraints can be attached to any selected content box and bear on the content of the content box. Such constraints define content aspects such as the content type (such as image, graphics, text, or so forth), content parameters (such as coding options, source url, or so forth), and content style (such as colors or transparency, font type, font size, patterns or thickness for graphic elements, or so forth). More generally, substantially any feature expressible in the syntax of the standard schema 14 can optionally be instantiated in association with a given content box (for instance the character encoding). In some embodiments, the content-based constraints include optional calls to libraries of predefined schema patterns, to be automatically embedded at translation time by the schema syntax translator 56. Such library calls can be used, for example, to introduce standard or commonly used watermarks, shapes, and so on. Content-driven constraints can be suitably selected in the graphical user interface 42 by menus, GUI dialog boxes, or other input mechanisms, and may call for independent content features or for predefined sets of styles, or for some union or combination of independent features and predefined feature sets or styles.

The graphical user interface 42 optionally displays potentially repeated content boxes and is configured to allow for the definition of potential additional constraints associated with the repetition of content boxes. Such constraints may include, for example, a minimum or maximum distance between two repetitions of a content box, insertion of a graphical element between repetitions of a content box, a specification of a maximum number of repetitions of repetitions of a content box, or so forth. In some embodiments, the repetition constraints are specified in conjunction with a visual fix point construction as defined in Pietriga et al., "VXT: A Visual Approach to XML Transformations", Proceedings of the 2001 ACM Symposium on Document Engineering, Atlanta, Ga. (2001). The technique of Pietriga uses a distinguished box (that is, a box having a recognizable visual signature that differentiates it from other boxes) on which the user may connect constraints like any other box, but which play the role of a substitution variable as in formal calculus having fixpoint constructors such as CSS or µ-calculus. One existence/repetition constraint that is advantageously implemented is a constraint on how many times a given content box can occur, or on how many items associated with the content box are allowed in any instance of a document conforming to the presentation schema 20. For example, the constraint may specify at most n times (i.e., in the range [0, n]), or at least one time (i.e., in the range [1, ∞)).

Figure 4:
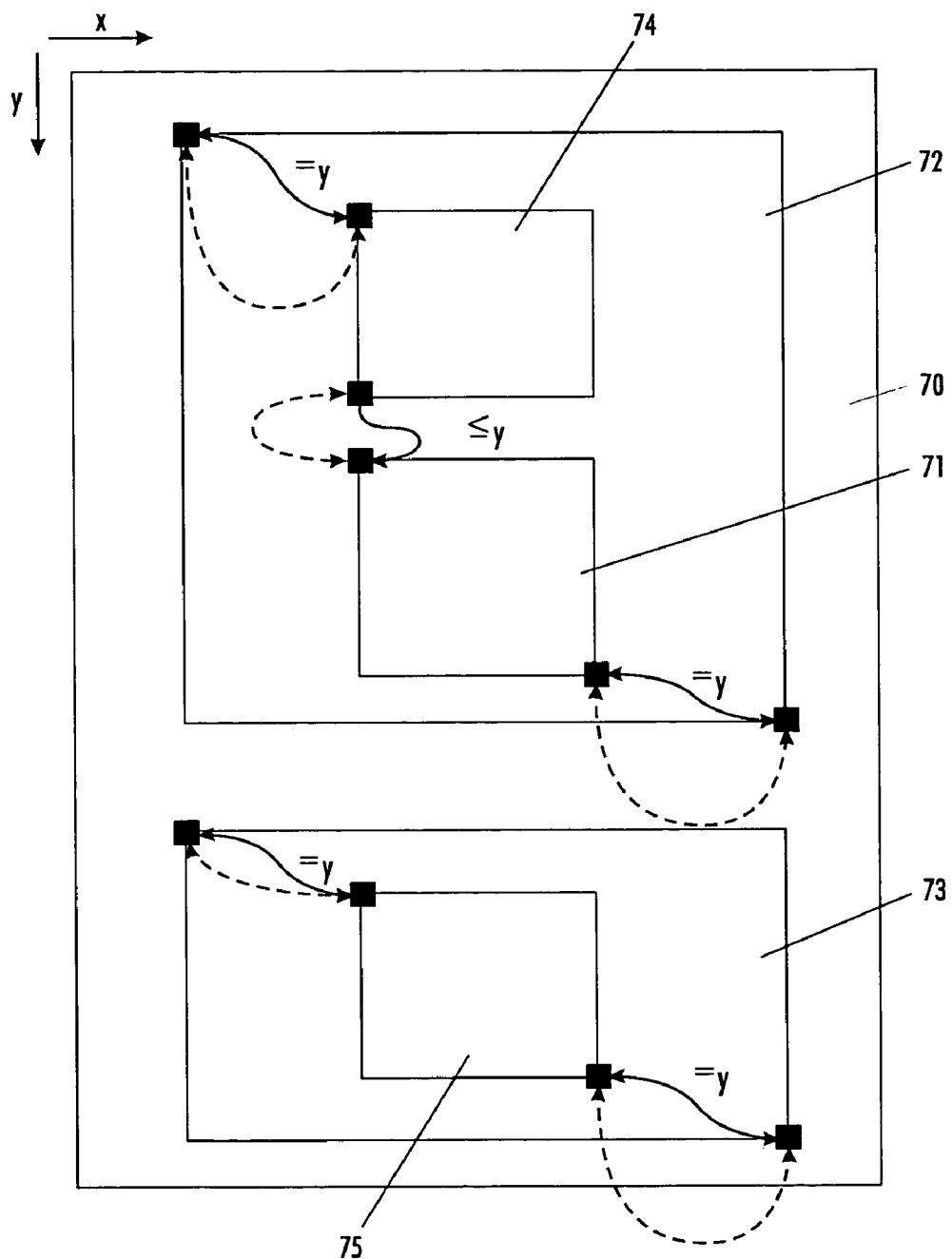
FIG. 4 diagrammatically shows an illustrative example of specifying a sequence of at least one vertically stacked box, in which the stacked boxes do not overlap but could be juxtaposed, and with left side horizontally aligned.

With reference to FIG. 4, an illustrative example is shown specifying a sequence of at least one vertically stacked box, in which the stacked boxes do not overlap but could be juxtaposed, and with left side horizontally aligned. In FIG. 4, content boxes 70, 71 represent the fixpoint constructor, content boxes 72, 73 represent alternatives (in this example a binary choice is represented by the illustrated two content boxes 72, 73, but there could be more), and the content boxes 74, 75 represent concrete or terminal areas. Spots selected by the user via the graphical user interface 42 as part of defining the content boxes are represented by small filled squares. Solid curved single-arrowhead lines symbolize $\leq_y$ constraints. Solid curved double-arrowhead lines represent $=_y$ constraints. Dashed curved lines similarly represent x-based constraints. Additional constraints are implicit but are not shown in order to avoid visual overloading, such as the constraints inherent to well-formed boxes and containers. Another form of specification can be written under a pseudo-algebraic constraint system, with the letter "A" symbolizing the content boxes 70, 71 that represent the fixpoint constructor, the separators "|" and "," representing respectively "alternation" and "coexistence in the representation space", and the constraint being recursively defined according to a "with" clause:

A=B|C

B=D:rect, A with $D.x_1=B.x_1$ and $D.y_1=B.y_1$ and $D.x_4<=A.x_1$ and $D.y_4<=A.y_1$ C=E:rect with $E.x_1=C.x_1$ and $E.y_1=C.y_1$ and $E.x_3=C.x_3$ and $E.y_3=C.y_3$ where coordinate pairs (x, y) are numbered around a rectangular area through a clockwise notation such that $(x_1, y_1)$ designates the upper-left coordinates and $(X_3, y_3)$ designates the lower-right coordinates.

With returning reference to FIG. 2, once the user defines the presentation constraints 50 using the graphical user interface 42, the data abstractor 52 operates to generate the abstract data model 54 from the presentation constraints 50. The outcome of all graphical operations defining content boxes and constraints to be ultimately described in the presentation schema 20 is captured in the intermediate abstract data model 54 that encodes the relevant information. In some embodiments, the abstract model 54 uses a notation specifying the set of content boxes as the set $\{B_j\}$, the set of spatial constraints as normalized linear relations on the coordinates of content boxes and spots (written for example in the form $(B_i.x_2<B_1.x_1+b)$), and specifying content-driven, repetition or any additional constraints associated with each content box in the form of feature-value pairs or another suitable notation. In the example abstract model 54, a box B is an object containing type information and positioning information that can be referenced using a suitable notation, such as $B.x_1$ to get the x-coordinates of top left corner. The spatial box containment relation can be captured in the example abstract model 54 using a box tree, which offers a convenient data structure for subsequent processing to generate the presentation schema in a typical standard schema syntax.

With continuing reference to FIG. 2, the abstract model 54 is translated into the presentation schema 20 having the syntax of the standard schema 14 by the schema syntax translator 56. This translation process converts the information stored in the abstract data model 54 into the presentation schema 20. As an illustrative example, the standard schema 14 is taken to be a schema that is validated using a combination of the RelaxNG and Schematron validation engines known in the art. The example translation produces two complementary schemas: (i) an s-schema that captures structural constraints which can be defined in RelaxNG or equivalent context free analyzer; and (ii) a c-schema that captures other constraints, such as relative positioning, using Schematron rules. The RelaxNG and Schematron schemas are suitably bound together through a gluing technology such as NRL (Namespace Routing Language), which allows chaining the two separate validations in one unique operation (from the user's point of view: a unique command).

The s-schema is set forth as follows. From the set of content boxes and their spatial constraints, a semi-lattice representation of the content boxes can be inferred based on the partial order induced by the inclusion relation. The first translation mechanism includes creating an s-schema, representing the tree structure associated with this semi-lattice, the tree-structure being unique modulo permutations among sister boxes. The RelaxNG syntax is one suitable formalism for representing this s-schema as it naturally tolerates for such permutations between sibling nodes. Other formalisms may be used, but may involve more complex formulations. It is advantageous to avoid over-specifying the target s-schema to account for all possible permutations leading to the same rendering. In other words, the "best" s-schema is the one that accepts the largest range of document instances conforming to the graphically represented presentation constraints 50 graphically defined by the user via the graphical user interface 42. In some embodiments, the level of generalness of the s-schema may be such that some visually valid document instances (that is, some document instances having a presentation appearance conforming with the graphically represented presentation constraints 50) will be rejected by validation respective to the s-schema, for example due to logically minor syntactic variations between the s-schema and the document instance, such as specifying different SVG versions. On the other hand, in the typical situation in which the s-schema set forth herein is used in conjunction with the instance creation process, no rejection due to such minor syntactic variations is expected.

The c-schema captures remaining non-structural constraints, both spatial and otherwise, in the Schematron syntax. Schematron rules bearing on XPath expressions can encode linear equations describing spatial constraints as well as logical formula bearing on sets of feature-value pairs by which on-spatial constraints are encoded. In some suitable embodiments, the Schematron rules are modeled as triples ($p_1$, $p_2$, <string>) where $p_1$ is an absolute XPath expression that specifies the rule application context, $p_2$ specifies the XPath logical property that must hold when evaluated in the previous context, and <string> is the message output by the output device 30 (FIG. 1) in the event of property violation detected as a validation error. As an example, the following rule captures the example property that in any page, the container $r_2$ must be located on the right side of the container $r_1$ (SVG document model):

$p_1$=//*[@class="page"]

$p_2$=./*[@class="r2"]/@x>./*[@class="r1"]/@x+./* [@class="r1"]/@width string="Container r2 must lay on right side of container r1"

With returning reference to FIG. 1, the presentation schema 20 is generated under the assumption that instances will be valid with respect to the standard schema 14. Toward this end, in some embodiments validation engine 12 first validates with respect to the standard schema 12, and validation with respect to the presentation schema 20 is performed only if the validation with respect to the standard schema 14 is successful.

Figure 5:
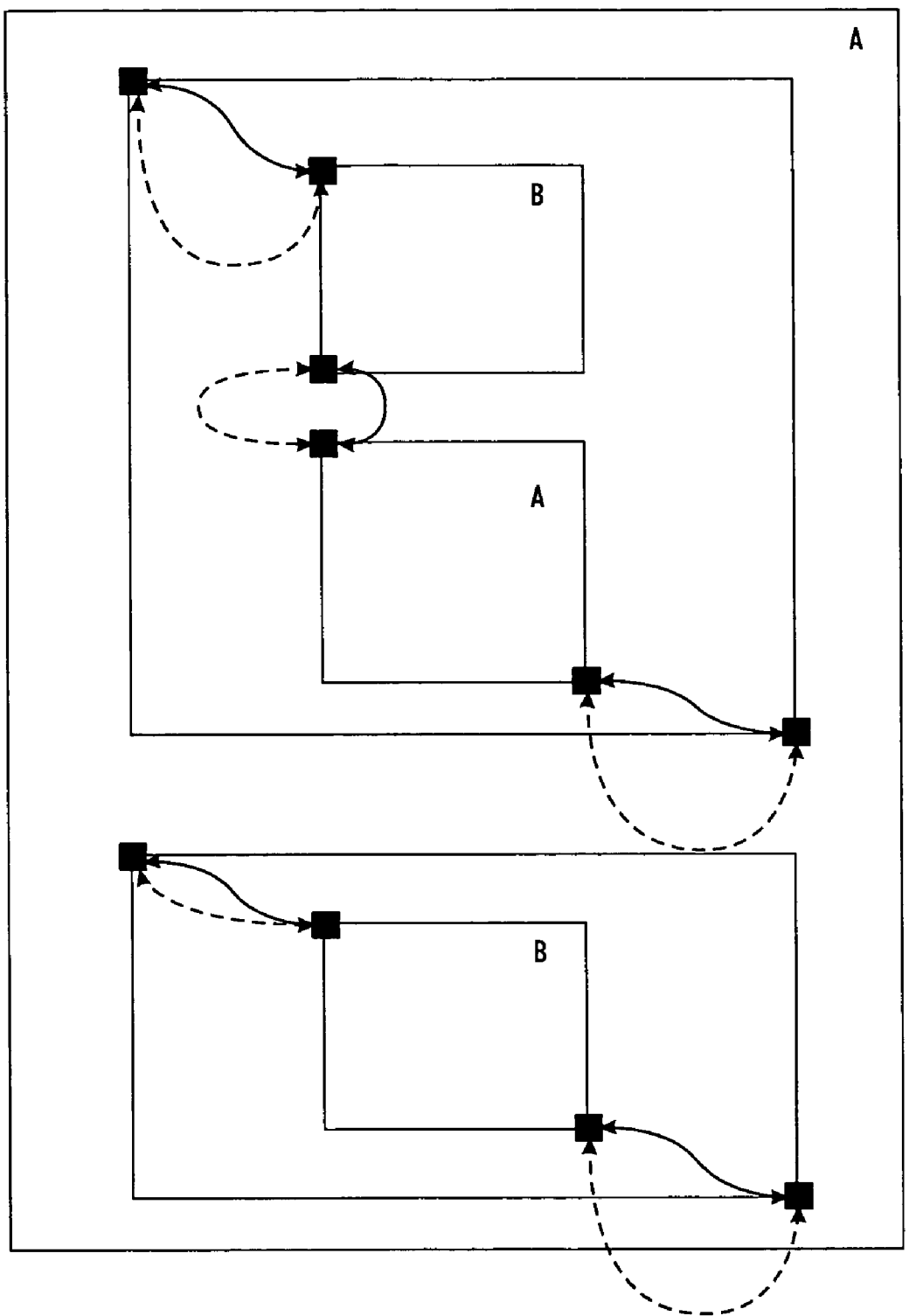
FIGS. 5 and 6 diagrammatically show another example of graphically represented presentation constraints.
Figure 6:
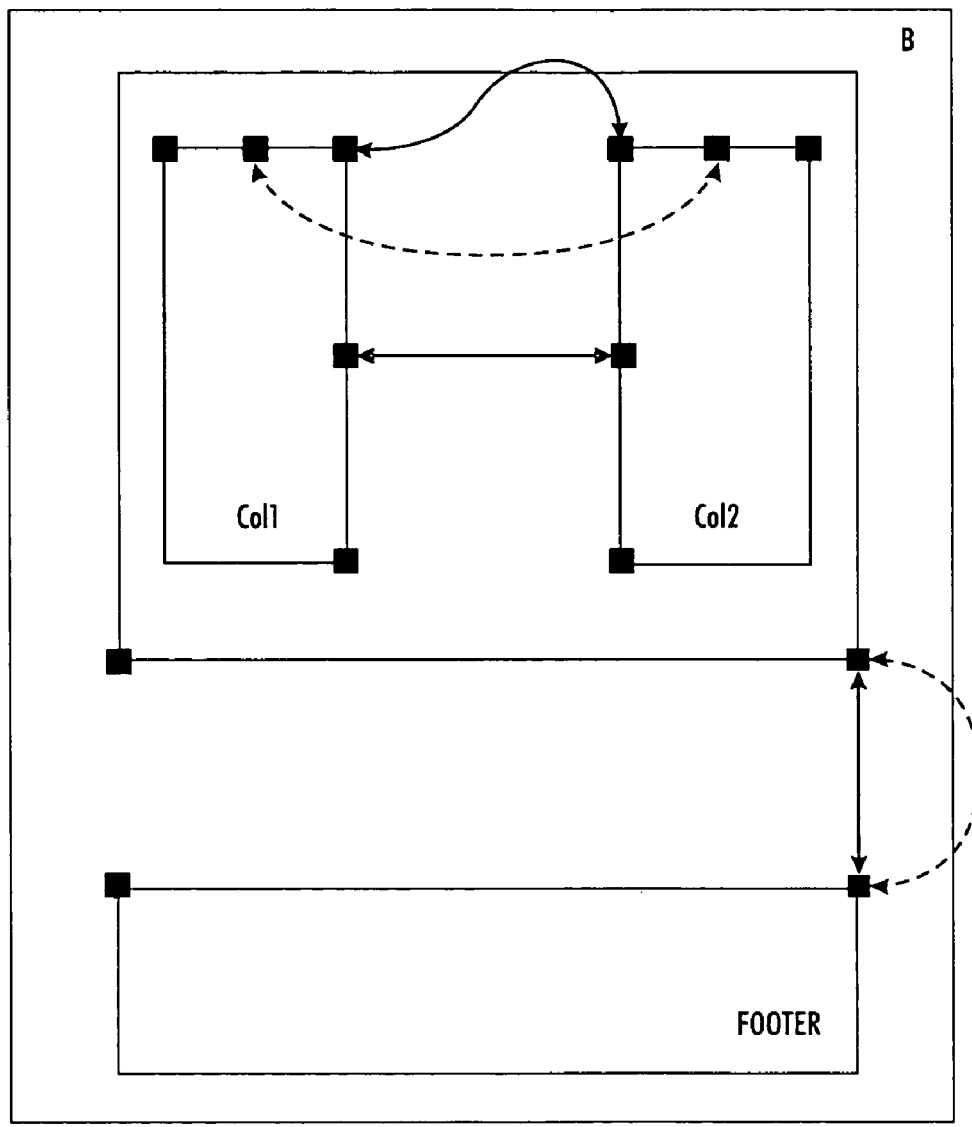

With reference to FIGS. 5 and 6, an example is given, in which a document is made of vertically stacked pages having two columns and a footnote area. FIGS. 5 and 6 show the graphically represented presentation constraints prepared by the publisher or other user using the graphical user interface 42. FIG. 5 shows graphical constraints on a page including content boxes labeled A and B (where, throughout the explanatory text describing this example of FIGS. 5 and 6, underscoring is used to denote labels of content boxes or containers) while FIG. 6 shows constraints of the content box B. The content boxes labeled Col1 and Col2 and footer can accept any graphical elements, and the presentation policy also is to specify that Col1 and Col2 have light gray background color and black border stroke. The following description is a fragment of the s-schema (using the RelaxNG compact syntax), and more specifically, the part that defines the root of valid instances:

```
default namespace svg = "http://www.w3.org/2000/svg"
namespace xlink="http://www.w3.org/1999/xlink"
datatypes xsd = "http://www.w3.org/2001/XMLSchema-datatypes"
start=root
version=attribute version {"1.2"}
coords=
    attribute x {xsd:decimal}
    attribute y {xsd:decimal}
    attribute width {xsd:decimal}
    attribute height {xsd:decimal}
common=
    attribute clip { "rect(-1, -1, -1, -1)" }
    version
root=element svg {
    coords,
    version,
    attribute preserveAspectRatio {"xMaxYMax"}?,
    B+
    }
```

Note that the top node of allowed instances must be an <svg> element, and it can only contain a B definition. The next image shows the s-schema for B containers (e.g., content boxes).

```
B=element svg {
    coords,
    common,
    attribute class {"B"},
    element rect {
        coords,
        attribute fill {"white"}
        attribute stroke {"black"}
        empty
    },
    ((Col1, Col2, footer) |
    (Col1, footer, Col2) |
    (Col2, Col1, footer) |
    (Col2, footer, Col1) |
    (footer, Col1, Col2) |
    (footer, Col2, Col1) )
    }
```

Note that again, the concept of a content box is translated by using another <svg> element, which defines a new viewport, that is, a new coordinate system relative to the current location in the parent viewport. The "clip" attribute ensures correct encapsulation of inner graphical objects. Three children are expected, more precisely a Col1, Col2 and footer subtrees, in any order. The container is captured using the "class" attribute, which is set forth in the SVG syntax.

The <rect> element is used for defining the visual parameters attached to the container. The fragments for Col1 and Col2 being analogous, only the Col1 code is shown here:

```
Col1=element svg {
    coords,
    common,
    attribute class {"Col1"},
        element rect {
            coords,
            attribute fill {"lightgrey"},
            attribute stroke {"black"},
            empty
        },
```

-continued

```
        Anysvg*
    }
along with the code for footer:
footer=element svg {
    coords,
    common,
    attribute class {"footer"},
        element rect {
            attribute id {"footer_"},
            coords,
            attribute fill {"lightgrey"},
            attribute stroke {"black"},
            empty
        },
        Anysvg*
    }
Anysvg=element * {(attribute*{text})*,Anysvg*} | text
```

Note that that both containers accept any child element that belongs to the SVG namespace.

Next, it is shown how positional constraints of the illustrative example are captured inside a Schematron specification:

```
<?xml version="1.0" encoding="UTF-8"?>
<schema xmlns="http://www.ascc.net/xml/schematron" xml:lang="en-US">
    <title>experimental validation for ID on presentation control</title>
    <ns prefix="svg" uri="http://www.w3.org/2000/svg"/>
    <pattern name="page dimension">
        <rule context="//svg:svg[@class='page']">
            <assert test="svg:svg[@class='Col1']/@width=svg:svg[@class='Col2']/@width">
            width of "Col1" area must equate width of "Col2" area</assert>
            <assert test="svg:svg[@class='Col1']/@height=svg:svg[@class='Col2']/@height">
            height of "Col1" area must equate height of "Col2" area</assert>
            <assert test="svg:svg[@class='Col1']/@y=svg:svg[@class='Col2']/@y">
            top side of "Col1" area must be aligned with top side of "Col2" area</assert>
            <assert test="svg:svg[@class='Col1']/@x=svg:svg[@class='footer']/@x">
            left side of "Col1" area and left side of "footer" area must be aligned</assert>
        </rule>
        <rule context="//svg:svg[@class='footer']">
            <assert test="svg:svg[@class='Col2']/@x
                    +svg:svg[@class='Col2']/@width=@x+@width">
            right side of "Col2" area and right side of "footer" area must be aligned</assert>
            <assert test="svg:svg[@class='Col1']/@y
                    +svg:svg[@class='Col1']/@height <= @y">
            bottom of "Col1" area must be above the top side of "footer" area</assert>
        </rule>
    </pattern>
</schema>
```

Figure 7:
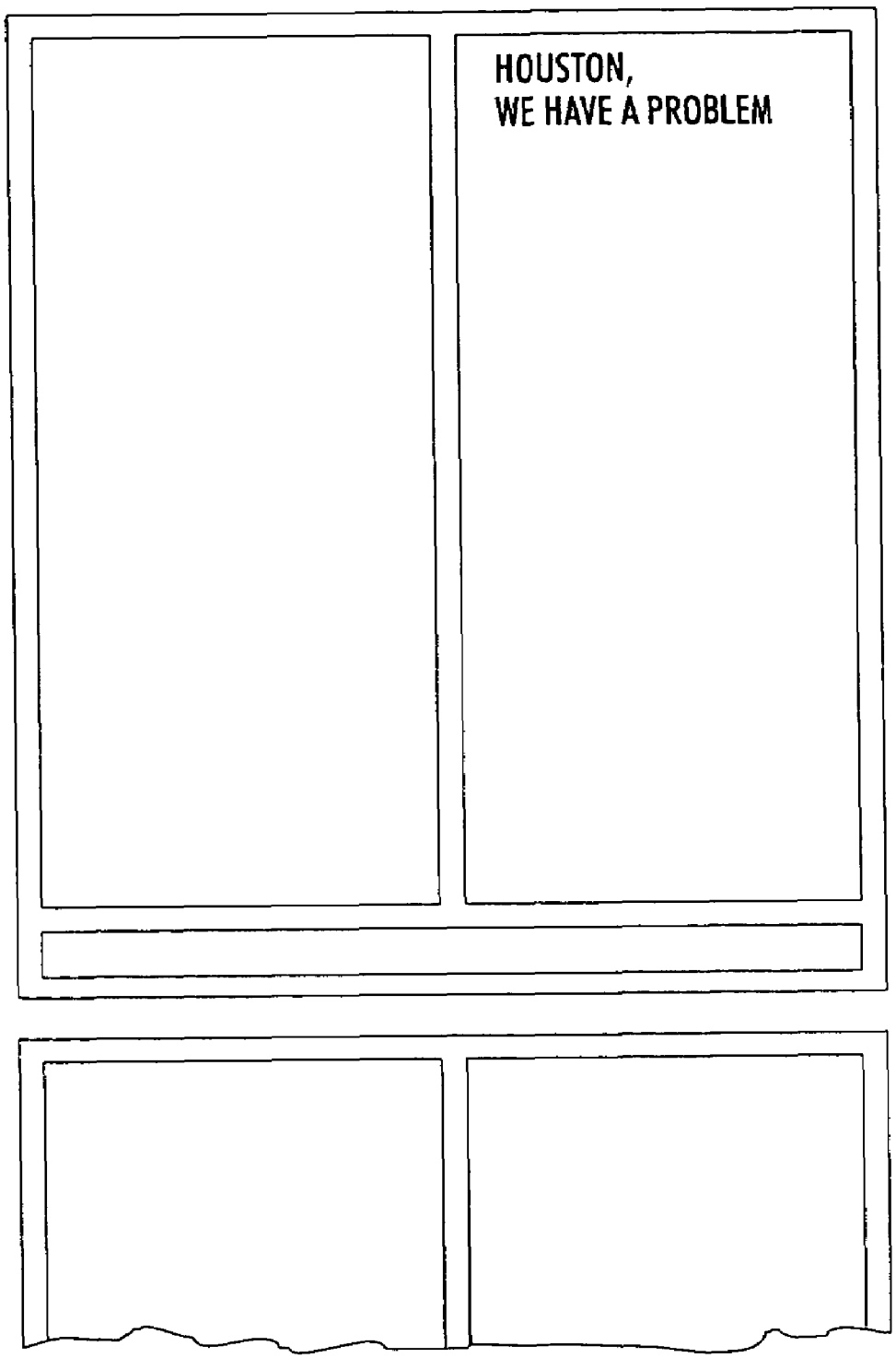
FIG. 7 diagrammatically shows a document instance portion for which the graphically represented presentation constraints of FIGS. 5 and 6 are satisfied.
Figure 8:
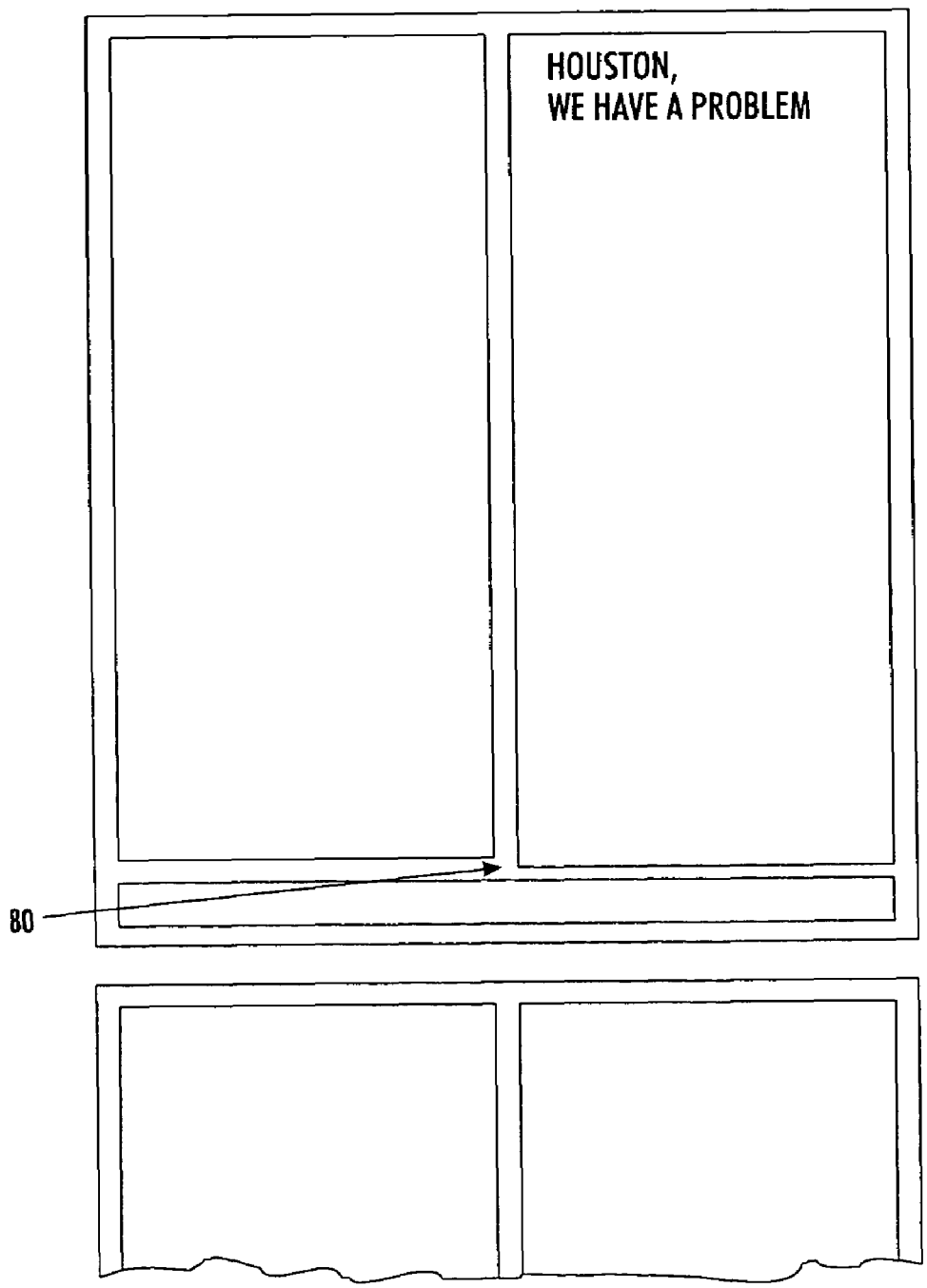
FIG. 8 diagrammatically shows a document instance portion for which the graphically represented presentation constraints of FIGS. 5 and 6 are not satisfied.

With reference to FIGS. 7 and 8, two example document instance portions are shown. The document instance portion of FIG. 7 validates both schemas, whereas the document instance portion of FIG. 8 fails the presentation schema due to a misalignment 80 of the Col2 area.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document rendering system comprising:
    a standard schema;
    a graphical user interface configured to receive graphically represented presentation constraints, which includes one or more one graphically represented content boxes, each box includes a spot that defines an anchor point for placement of the content box;
    a data abstracter configured to convert the graphically represented presentation constraints into a data abstraction model, wherein a notation specifies the one or more content boxes, a set of spatial constraints as normalized linear relations on the coordinates of content boxes and spots, and specifies additional constraints associated with each content box in the form of feature-value pairs;
    a translation engine configured to translate the graphically represented presentation constraints into a presentation schema conforming with a syntax of the standard schema, including an s-schema that includes a tree structure semi-lattice representation of the graphically represented presentation constraints to capture structural constraints and a c-schema that includes one or more sets of feature-value pairs to capture non-structural constraints;
    a validation engine configured to validate a document respective to the standard schema and respective to the presentation schema, including a RelaxNG validation engine configured to validate the s-schema and a Schematron validation engine configured to validate the c-schema; and
    a rendering engine configured to render a document, via a printing device and/or a display, conditional upon validation by the validation engine.

2. The document rendering system as set forth in claim 1, wherein the graphical user interface is configured to receive the graphically represented presentation constraints including at least one or more graphically represented content boxes and geometrical constraints on said content boxes.

3. The document rendering system as set forth in claim 2, wherein the graphical user interface comprises:
    a graphical display; and
    a pointing device cooperating with the graphical display to enable a user to identify points graphically delineating the graphically represented content boxes.

4. The document rendering system as set forth in claim 3, wherein the graphical user interface further comprises:

a relative positioning constraint input device configured to receive positioning constraints of content boxes relative to one another.

5. The document rendering system as set forth in claim 4, wherein the relative positioning constraint input device comprises:
logic configured to generate a relative positioning constraint based on an identification of points delineating content boxes received from the cooperating pointing device and graphical display.

6. The document rendering system as set forth in claim 2, wherein the graphical user interface further comprises:
a repetition input device configured to receive a constraint on repetition of a graphically represented content box.

7. The document rendering system as set forth in claim 2, wherein the graphical user interface is further configured to receive one or more constraints on content of a graphically represented content box.

8. The document rendering system as set forth in claim 7, wherein the one or more constraints on content of a graphically represented content box are selectable from a group including at least (i) object type, (ii) font attribute, and (iii) font type.

9. The document rendering system as set forth in claim 1, wherein the translation engine comprises:
a schema syntax translator configured to translate the data abstraction model into the presentation schema conforming with the syntax of the standard schema.

10. The document rendering system as set forth in claim 1, wherein the standard schema comprises a scalable vector graphics (SVG) schema.

11. A document validation method, comprising:
receiving graphically represented presentation constraints;
translating the graphically represented presentation constraints into a presentation schema conforming with a syntax of a standard schema, which includes one or more one graphically represented content boxes, each box includes a spot that defines an anchor point for placement of the content box;
converting the graphically represented presentation constraints into a data abstraction model, wherein a notation specifies the one or more content boxes, a set of spatial constraints as normalized linear relations on the coordinates of content boxes and spots, and specifies additional constraints associated with each content box in the form of feature-value pairs;
translating the data abstraction model into the presentation schema conforming with the syntax of the standard schema, including an s-schema that includes a tree structure semi-lattice representation of the content boxes to capture structural constraints and a c-schema that includes one or more sets of feature-value pairs to capture non-structural constraints; and
validating a document respective to the standard schema and the presentation schema, validating the s-schema with a RelaxNG validation engine and validating the c-schema with a Schematron validation engine.

12. The document validation method as set forth in claim 11, wherein the receiving of graphically represented presentation constraints comprises:
graphically delineating one or more content boxes.

13. The document validation method as set forth in claim 12, wherein the graphical delineating comprises:
receiving identification of a plurality of points delineating the one or more content boxes via a graphical user interface.

14. The document validation method as set forth in claim 13, wherein the receiving further comprises:
receiving a geometrical constraint on a position of one of the content boxes respective to a position of another of the content boxes.

15. The document validation method as set forth in claim 12, wherein the receiving further comprises:
receiving a constraint on content of one or more of the graphically delineated content boxes.

16. A document rendering system, comprising:
a standard schema;
a graphical user interface including a graphical display and a pointing device cooperating with the graphical display, the graphical user interface configured to receive one or more geometrically constrained content boxes delineated using the graphical display and cooperating pointing device;
a translation engine configured to translate the one or more geometrically constrained content boxes into a presentation schema conforming with a syntax of the standard schema, including an s-schema that includes a tree structure semi-lattice representation of the content boxes to capture structural constraints and a c-schema that includes one or more sets of feature-value pairs to capture non-structural constraints;
a validation engine configured to validate a document respective to the standard schema and respective to the presentation schema, including a RelaxNG validation engine configured to validate the s-schema and a Schematron validation engine configured to validate the c-schema; and
a rendering engine configured to render a document conditional upon validation by the validation engine.

17. The document rendering system as set forth in claim 16, wherein (i) the graphical user interface is further configured to receive one or more constraints on content of a graphically represented content box and (ii) the translation engine is further configured to translate the one or more constraints on content into at least a portion of the presentation schema conforming with a syntax of the standard schema.

* * * * *